Figure 12:
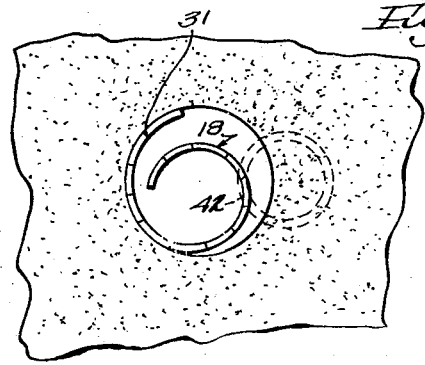

Nov. 29, 1927.  
L. C. GNAGI  
1,651,269  
LINER FOR PIPE OPENINGS AND METHOD OF PRODUCING THE SAME  
Filed Feb. 13, 1926  5 Sheets-Sheet 1
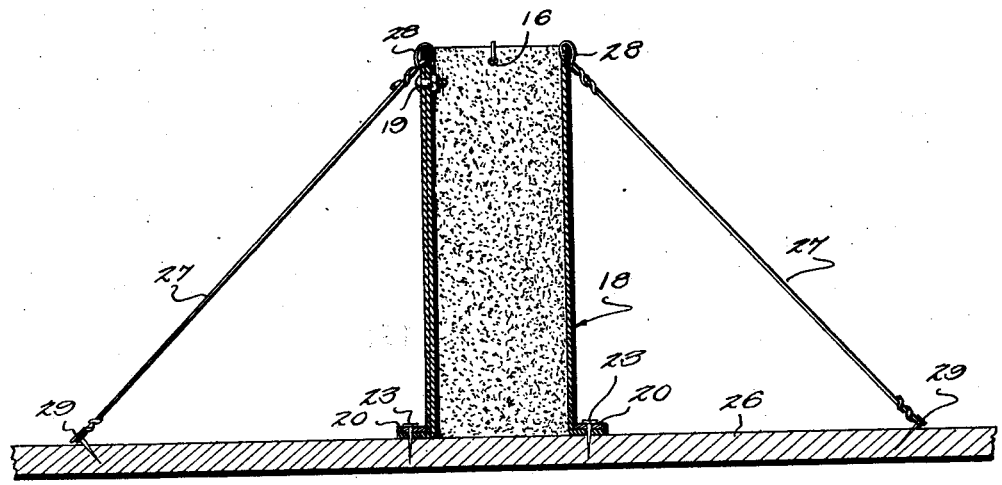
Fig.1.
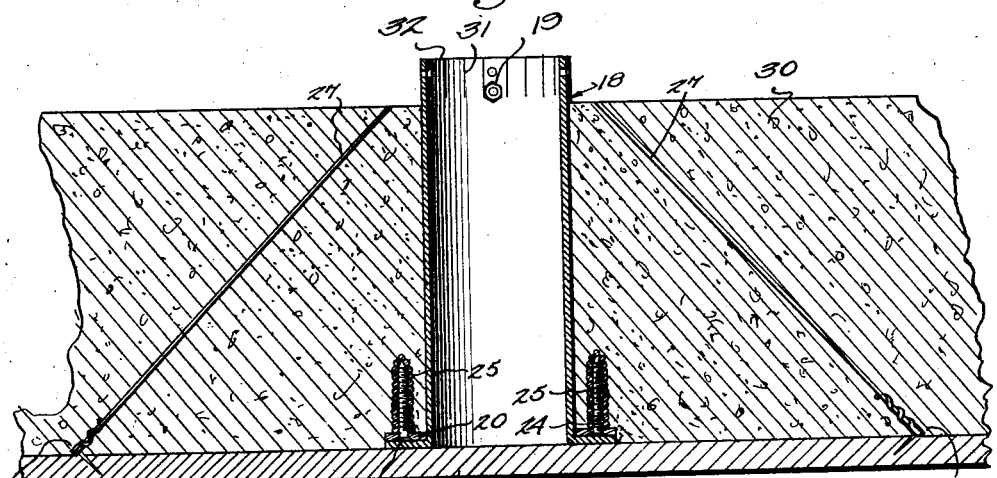
Fig.2.
Fig.3.
Inventor  
LAWREN C. GNAGI  
By Ch. Parker  
Attorney Nov. 29, 1927.
L. C. GNAGI
1,651,269
LINER FOR PIPE OPENINGS AND METHOD OF PRODUCING THE SAME
Filed Feb. 13, 1926    5 Sheets-Sheet 2
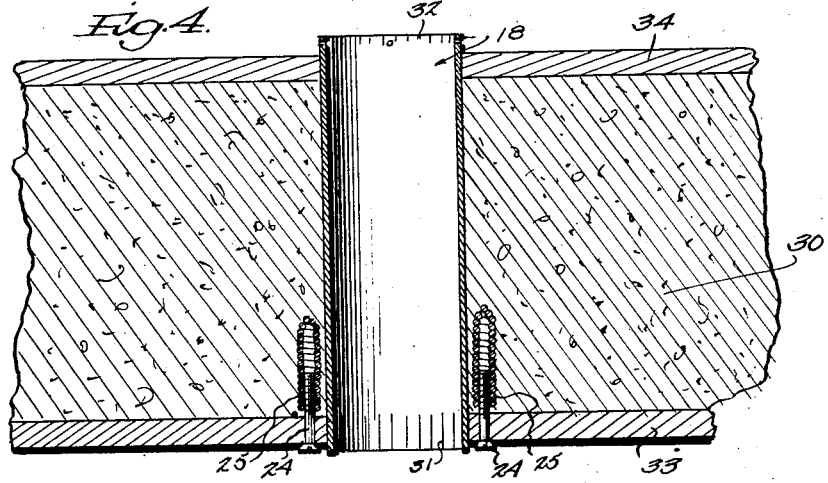
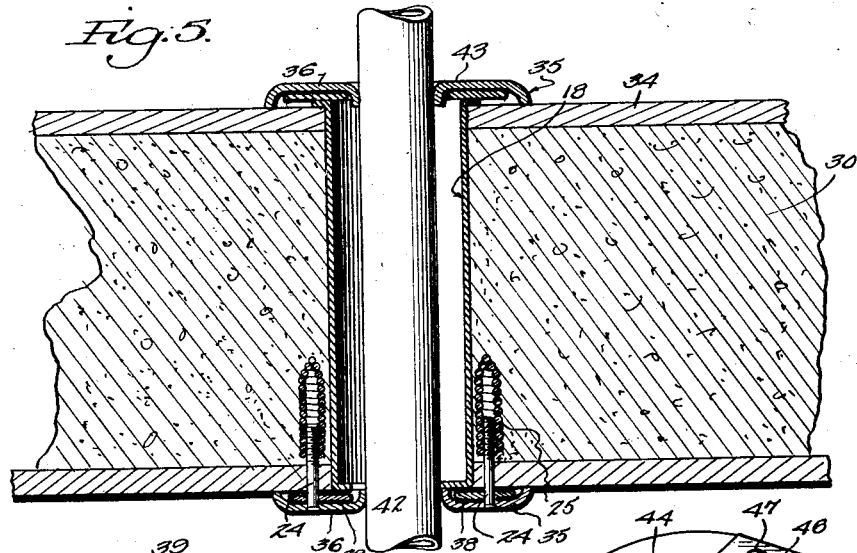
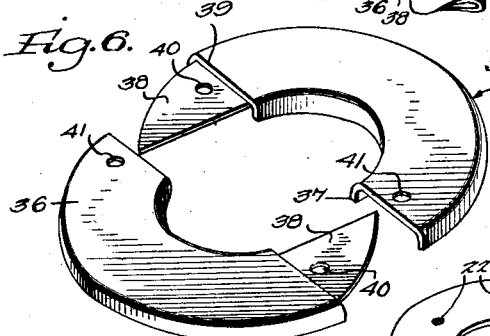
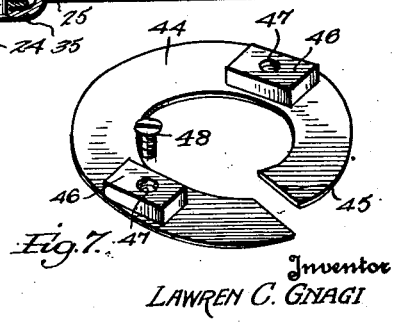
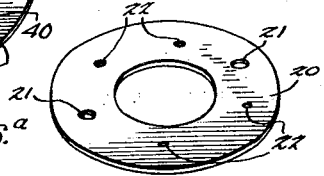
Inventor
LAWREN C. GNAGI
Attorney Nov. 29, 1927.
L. C. GNAGI
1,651,269
LINER FOR PIPE OPENINGS AND METHOD OF PRODUCING THE SAME
Filed Feb. 13, 1926
5 Sheets-Sheet 3
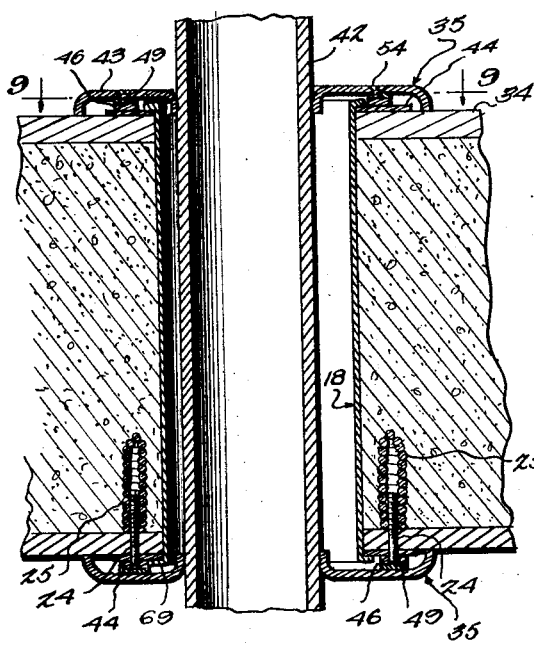
Fig. 8.
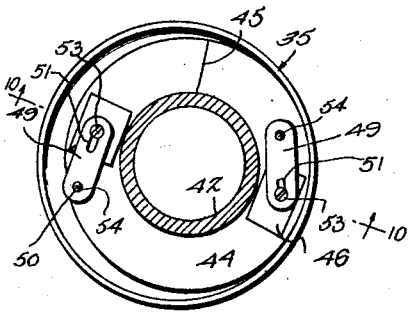
Fig. 9.
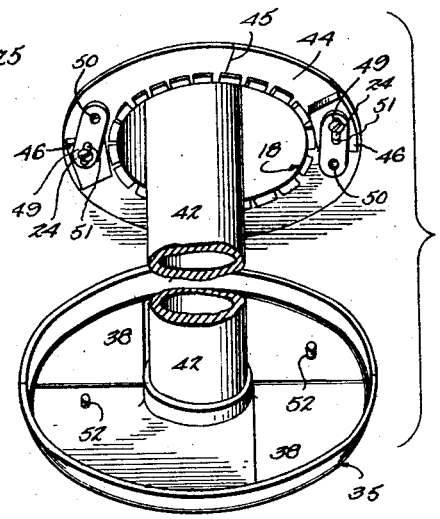
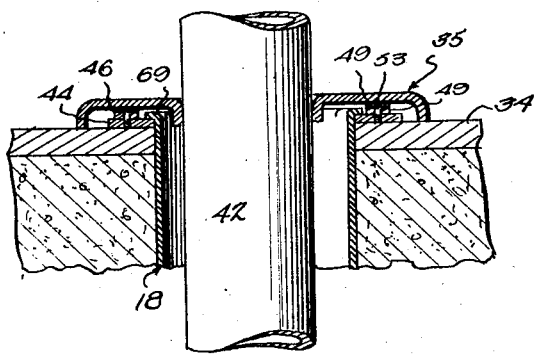
Fig. 10.
Fig. 11
Inventor
LAWREN C. GNAGI
By
Attorney Nov. 29, 1927. 1,651,269
L. C. GNAGI
LINER FOR PIPE OPENINGS AND METHOD OF PRODUCING THE SAME
Filed Feb. 13, 1926 5 Sheets-Sheet 4

Inventor
LAWREN C. GNAGI

Attorney

Nov. 29, 1927.    1,651,269
L. C. GNAGI
LINER FOR PIPE OPENINGS AND METHOD OF PRODUCING THE SAME
Filed Feb. 13, 1926    5 Sheets-Sheet 5
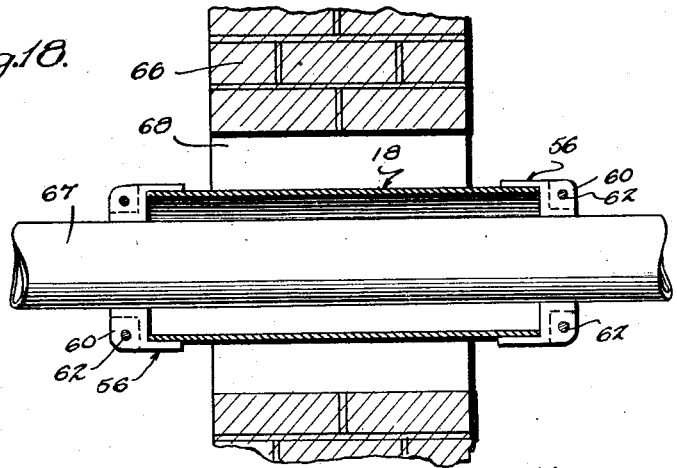
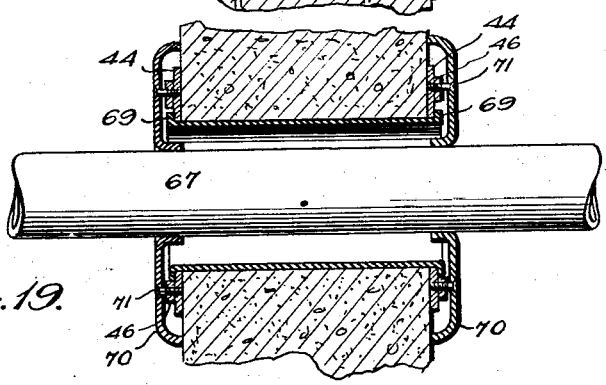
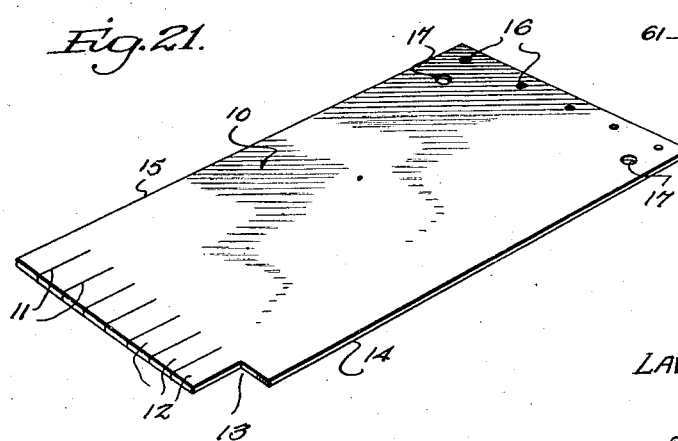
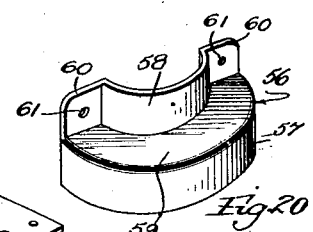
Inventor
LAWREN C. GNAGI Patented Nov. 29, 1927.

1,651,269

UNITED STATES PATENT OFFICE.

LAWREN C. GNAGI, OF LIMA, OHIO.

LINER FOR PIPE OPENINGS AND METHOD OF PRODUCING THE SAME.

Application filed February 13, 1926. Serial No. 88,147.

This invention relates to liners for pipe openings and method of producing the same.

An important object of the invention is to provide a lining sleeve structure from which the finished liner is to be formed, adapted to be placed in position prior to the formation of concrete or other walls or floors and adapted normally to remain therein to provide an opening for the passage of steam pipes and the like.

A further object is to provide a sleeve structure of the above mentioned character provided with means for securing a ceiling plate or the like in position after the pipes have been inserted through the sleeve.

A further object is to provide a sleeve structure of the character mentioned which may be readily removed from the opening in which it is arranged if it develops that the sleeve has been set in improper position so that the pipe cannot be inserted therethrough.

A further object is to provide a sleeve structure of the above mentioned character substantially larger than the pipe to be inserted therethrough, means being provided for securing a ceiling plate in position when the pipe extends through the sleeve eccentrically with respect thereto.

A further object is to provide means for securing a floor plate in position around the pipe after the latter has been inserted through the sleeve.

A further object is to provide means for supporting the sleeve in position on a steam or other pipe after the sleeve has been found to be incorrectly placed, and has been removed to permit the enlargement of the opening in the floor or wall.

In producing the finished liners, I employ sheets of flexible metal or the like each of which is slit at one end to provide a plurality of fingers after which the sheets are rolled by hand or otherwise into open ended tubes of suitable size to receive the pipe which is to be positioned therein. After each tube has been thus rolled, a collar is slipped over the upper end of the sleeve to prevent it from opening, whereupon the fingers described are bent outwardly at right angles to the axis of the sleeve. The collar is moved downwardly into contact with the fingers, and any suitable fastening means are employed for holding the upper ends of the sleeves to prevent them from opening. In forming the tube or sleeve, the edges of the sheet overlap each other and remain in this position. In practice, I prefer to employ a fastening element at the upper end of the sleeve in the form of a bolt passing through the overlapped portions of the sleeve, this bolt being removed after the floor has been formed around the sleeve in the manner to be described. The collar is provided as a supporting means for screws or other sockets, and in assembling the device in the manner referred to the screws are inserted through openings in the collar and secured to the sockets, the latter remaining in the wall or floor after it is finished. After the fingers have been bent outwardly and the collar and associated elements placed in position, the collar and fingers may be nailed or otherwise secured against a form of wood or the like built to support the floor during the formation thereof. A concrete or other floor may be formed in the usual manner surrounding the sleeve and supported on the form, and after the floor has properly set, the form is removed. This exposes the fingers and the latter may be bent downwardly to their initial position forming continuations of the sleeve parallel to the axis thereof, whereupon the screws are removed to permit the collar to be drawn downwardly from the lower end of the sleeve. This operation leaves the sockets embedded in the ceiling ready to receive fastening elements by means of which the ceiling plate may be secured in position. The steam pipe is then inserted in position and a suitable ceiling plate, such as will be described, is placed in position around the steam pipe and moved upwardly into contact with the ceiling, the plate loosely fitting the pipe to permit expansion and contraction thereof. The plate employed is provided with openings adapted to register with the sockets embedded in the ceiling, and fastening elements such as screws may be arranged in the openings in the plate and threaded into the sockets. Under some building conditions, where the steel framework has been completed, it is sometimes desired to place the risers in position prior to the formation of the successive floors. Under such conditions it will be obvious that the sleeve cannot be supported on the floor forms. Under such conditions the sleeve may be rolled in the manner described and may be supported in position around the risers, the supporting means being adapted to hold the sleeve in position to prevent it from opening until the floor has been completed. The sleeve employed is preferably of greater length than the thickness of the floor in which it is to be arranged whereby the upper end of the sleeve projects above the floor line. After the floor has been completed the upwardly extending end of the sleeve is cut off to permit a suitable floor plate to be placed in position.

Other objects and advantages of the invention will be apparent during the course of the following description.

Figure 14:
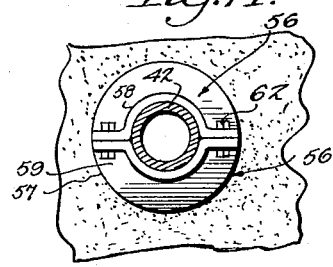
Figure 13:
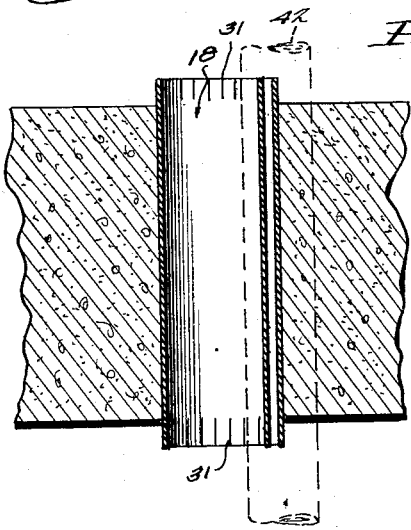
Figure 15:
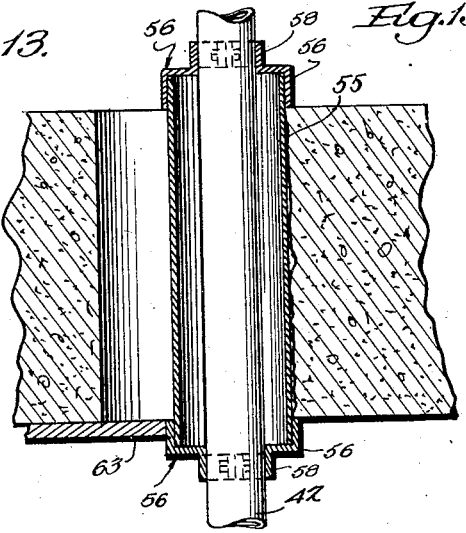
Figure 16:
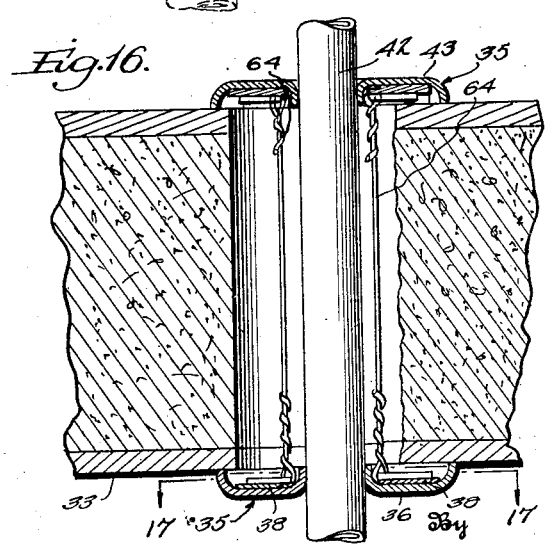
Figure 17:
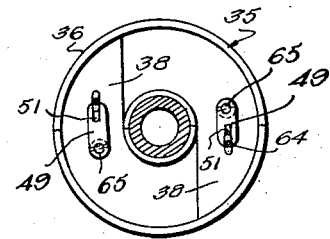

In the drawings I have shown several forms of the invention. In this showing,

Figure 1 is a sectional view taken centrally through the sleeve showing the latter in initial position, Figure 2 is a similar view showing the floor formed around the sleeve, Figure 3 is an enlarged detail view similar to Figure 2 showing the lower end of the sleeve and associated elements, Figure 4 is a view similar to Figure 2 showing the ceiling formed against the lower face of the floor, Figure 5 is a similar view showing the device completely assembled, Figure 6 is a perspective view of one of the ceiling or floor plates, Figure 6ª is a detail perspective of one of the supporting plates, Figure 7 is a similar view of one of the floor plate securing elements, Figure 8 is a view similar to Figure 5 showing the means for securing the ceiling plate in position when the pipe is not centered within the sleeve, Figure 9 is a section on line 9—9 of Figure 8, Figure 10 is a detail section of the upper end of the sleeve and associated elements taken on line 10—10 of Figure 9, Figure 11 is a fragmentary perspective view showing the assembly of the elements at the lower end of the sleeve, Figure 12 is a plan view of the sleeve showing the method of removing it, Figure 13 is a central vertical sectional view of the same, Figure 14 is a horizontal sectional view through the steam pipe taken above the floor showing the method of supporting the sleeve in a newly formed opening in the floor, Figure 15 is a central vertical sectional view showing the same, Figure 16 is a central vertical sectional view showing the modified method of securing the floor and ceiling plates in position, Figure 17 is a detail section on line 17—17 of Figure 16.

Figure 18 is a central vertical sectional view showing the means of securing the sleeve in position in a wall, Figure 19 is a view similar to Figure 18 showing the device completely assembled, Figure 20 is a detail perspective of one of the supporting cup members, and, Figure 21 is a detail perspective showing the blank used in making the sleeve.

Referring to Figure 21 of the drawings, the numeral 10 designates the blank employed in forming the sleeve to be described. This blank is formed of flexible sheet metal and is slit adjacent one end as at 11 to provide a plurality of fingers 12 for a purpose to be described. Adjacent one side, the sheet of material is cut away as at 13 to permit the edge 14 of the material to overlap the opposite edge 15. The end of the sheet opposite the fingers 12 may be provided with a plurality of relatively small openings 16, and inwardly of the openings the sheet is provided with a pair of somewhat larger openings 17 adjacent opposite edges. In forming the sleeve, the sheet 10 may be wrapped around a suitable mandrel such as any convenient piece of pipe or the like to provide a substantially circular sleeve 18 as shown in Figure 1. After the sleeve has been formed in a manner described, a bolt or similar fastening element 19 is passed through the openings 17, the latter being adapted to register with each other after the sleeve is rolled or wound. A collar 20 is then slipped over the opposite end of the sleeve to hold the device in proper position and to prevent it from opening as will be apparent. The collar 20 is formed of relatively heavy sheet metal as illustrated in Figure 6ª of the drawings. As shown, the collar 20 is provided with diametrically opposite openings 21, and is further provided between these openings with a plurality of relatively small openings 22 adapted to receive short flat headed nails or the like 23 as shown in Figure 1. In one face of the collar 20, the openings 21 are preferably counter-sunk as shown in Figure 3 to permit a screw or the like 24 to be inserted through the opening. A spiral screw socket 25 surrounds the screw 24 when the device is assembled as shown in Figure 3. This socket is a commercially available device formed of spirally wound heavy wire to form a screw socket, but the invention is not limited to the use of the particular socket illustrated.

In Figure 1 of the drawings I have shown the device arranged in its initial position over a floor form 26 of the usual type, preferably formed of wood. Guy wires 27 may be connected as at 28 to the openings 16 in the upper end of the sleeve and the opposite end of the guy wires may be secured to the form 26 by nails or the like 29 to prevent the upper end of the sleeve from becoming displaced while the floor is being formed. With the device arranged in the position shown, the nails 23 are driven downwardly into the form 26 through the openings 22 as will be obvious. Thus it will be apparent that the sleeve conveniently may be arranged over a form, after which the floor 30 may be formed as shown in Figure 2. While I have illustrated the use of guy wires 27 for supporting the sleeve, these members usually may be dispensed with since the nails 23 serve to efficiently support the sleeve. The sleeve may be provided in any suitable lengths according to the thickness of the floor in which it is to be employed, but in each individual case I prefer to employ a sleeve of such a length that the bolt 19 will be arranged above the floor line as indicated in Figure 2.

After the floor has been formed, as described, the supporting form 26 may be removed as will be apparent. In the use of the device, I prefer to fill the sleeve with sand as illustrated in Figure 1 to prevent concrete or the like from being poured into the sleeve while the floor is being poured.

The presence of the sand also prevents the sleeve from being collapsed when the floor is formed of concrete which is usually tamped after it is poured. The use of the sand ordinarily is not essential however and may be eliminated if desired. If the sand is employed, the removal of the form 26 permits the sand to be emptied from the sleeve as will be apparent. After the removal of the form the fingers 12 are bent downwardly to their original positions parallel to the axis of the sleeve, whereupon the screws 24 may be removed from their sockets and the collars 20 slipped off the lower end of the sleeve. The screws 24 are then reinserted in the sockets, but project downwardly therefrom a distance greater than the thickness of the plaster to be applied to the ceiling. These screws are permitted to remain in this position until the plastering has been completed. The bolt 19 is then removed from the upper end of the sleeve and it will be apparent that under such conditions the sleeve is prevented from unrolling only by the presence of the concrete, no mechanical fastening elements being secured between the overlapping ends of the sleeve, or surrounding the sleeve. The upper end of the sleeve is then slit as at 31, to provide a plurality of fingers 32 for a purpose to be described. These fingers may be formed by cutting the slits 31 by tin snips, and this operation may be performed either before or after the flooring has been placed in position, or before or after the pipe has been inserted through the sleeve. The guy wires 29 are cut off with tin snips or the like as close to the floor as possible and the loops at the upper ends thereof removed from the openings 16, as shown in Figure 2 of the drawings.

After the operations referred to have been completed, the ceiling 33 and floor 34 are placed in position, and it will be apparent that the material forming the floor and ceiling will be prevented from entering the sleeve by the projecting ends thereof. As shown in Figure 4, the screws 24 are left projecting downwardly whereby they form openings through the plaster or other material forming the ceiling.

The risers of the pipes may be inserted through the sleeve either after the floor and ceiling have been placed in position or before these operations have commenced and the riser will occupy the position shown in Figure 5 of the drawings if the sleeve has been properly centered. It is desired to finish off the opening around the pipe at the lower end of the sleeve, and for this purpose I provide a ceiling plate indicated as a whole by the numeral 35 in Figure 6 of the drawings. This plate comprises a pair of complementary sections 36, each of which is substantially semicircular, and the sections may be formed of stamped sheet metal as shown or may be cast from any suitable material as will be apparent. Each section is preferably provided with flanges 37, and one end of each section is provided with a tongue 38 offset from the face of the plate as at 39 to permit it to be inserted in the opposite plate section. Each of the tongues 38 is provided with an opening 40 which is adapted to aline with openings 41 formed in the body portions of the plate sections when the latter are assembled. The space between the respective pairs of openings 40 and 41 is equal to the space between the sockets 25 as will be apparent. When it is desired to place the ceiling plate in position, the screws 24 are removed from the sockets through the openings formed by the screws in the ceiling, whereupon the ceiling plate is assembled by placing the sections thereof around the steam pipe 42 illustrated in Figure 5 of the drawings. The ceiling plate is moved upwardly against the ceiling and is revolved until the respective openings 40 and 41 aline with the sockets 25 whereupon the screws 24 are inserted in the openings 40 and 41 and screwed up into the socket 25. This operation permanently secures the ceiling plate in position against the ceiling to prevent any vertical movement of the plate, and the opening formed in the center thereof loosely surrounds the pipe to permit vertical movement thereof under the influence of expansion and contraction.

The fingers 32 at the upper end of the sleeve may be bent outwardly at an angle and are then cut off by tin snips so that they project only a slight distance above the floor. This cutting operation may be performed either before or after the floor 34 is placed in position, or before or after the pipe 42 has been inserted in the sleeve, the outward bending of the fingers 32 merely facilitating the cutting operation. After being cut, the portions of the fingers remaining on the upper end of the sleeve are bent outwardly and a floor plate 43, which may be similar to the plate 35, is arranged in position around the pipe and rests upon the floor. Ordinarily the plate 43 is permitted to remain in its position by gravity since architects usually do not specify that the floor plates be anchored. I provide means however, whereby the floor plates may be anchored in position if desired, or if specified by an architect. In Figure 7 of the drawings I have shown a plate 44 adapted for use in securing the plate 43 in position. The plate 44 is formed of flexible sheet metal and is split as at 45. At diametrically opposite points blocks 46 are spot welded or otherwise secured to the plate 44, and each block is provided with threaded openings 47. The position of the openings 47 corresponds to the position of the screw openings provided in the plate 43, the latter openings being similar to the openings 40 and 41 of the plate 35. When the plate 44 is to be employed, it is flexed by laterally separating the split ends thereof to permit it to be placed in position around the riser. It is then slipped over the upper end of the sleeve by passing it around the fingers 32 and contacts with the floor as shown in Figure 5. The fingers 32 are then bent outwardly and downwardly to contact with the plate 44 to secure the latter in position, whereupon the plate 43 may be arranged in contact with the floor, surrounding the riser in the manner described. Screws 48 are then inserted through the openings in the plate 43 and are threaded in the openings 47 whereupon it will be apparent that the floor plate will be secured in position.

In Figures 8 to 11 inclusive, I have illustrated means for securing the floor and ceiling plates in position where the sleeve has been mounted slightly out of alinement with the riser to be inserted therethrough. When placing the sleeves in position, the location for the sleeves is usually determined by measuring from the center of previously erected columns and the like and it is very difficult to accurately center them with respect to the risers. As previously stated however, the sleeve is substantially larger in diameter than the pipe to be inserted therethrough, and consequently no trouble is experienced in inserting the pipe if the sleeve is only slightly out of alinement as illustrated in Figures 8 to 11 inclusive. Under such conditions however, it will be apparent that the screws 24 cannot be inserted through the ceiling plates and threaded into the sockets 25, nor can the screws 48 be placed in position in the manner previously described. Under the conditions stated, I employ clips 49 formed of metal sufficiently thick to permit it to be drilled and tapped. Each clip 49 is provided at one end with a threaded opening 50 and at its opposite end with a slot 51. When it is desired to place the ceiling plate in position, the screws 24 are inserted through the slots 51 and are rotated until they frictionally engage the clips 49. The opposite ends of the clips extend in opposite directions as shown in Figure 11, and the openings 50 are arranged to coincide with the openings in the ceiling plate. Short screws 52 then may be inserted through the openings in the ceiling plate and threaded into the openings 50 to secure the ceiling plate in position. It will be apparent that the clips may be revolved about the screws 24 according to the relative positions of the axes of the riser and the sleeve in which it is inserted to permit the openings 50 to aline with the openings in the ceiling plate. Similarly a pair of clips 49 may be secured to the blocks 46 by short screws 53, and the free ends of the clips may be swung to proper positions to aline the openings 50 with screws 54 adapted to be passed through the openings in the floor plate 43.

It sometimes occurs that the degree of misalinement of the risers and sleeves is such that the former cannot be inserted in the latter, in which case it is necessary to remove the sleeves and enlarge the opening in the floor, to permit the pipe to be placed in position. As previously stated, the sleeve is held in position only by the concrete or other material which surrounds it, no fastening elements of any kind being employed after the sleeve has been positioned in the manner previously described. When it becomes necessary to remove the sleeve, a workman may grasp the inner overlapping end of the sleeve with a pair of pliers or the like and revolve it substantially to the position indicated in Figures 12 and 13 whereupon upward force may be exerted to withdraw the sleeve from its opening. This operation may be readily performed and eliminates the necessity of drilling the concrete around the sleeve to permit its removal. After the sleeve has been removed in the manner described, the opening is enlarged as at 55, the direction in which the opening is enlarged depending upon the position of the steam pipe as will be obvious. After this operation has been completed it is desired to replace the sleeve and to fill the opening opposite the portion which has been enlarged. In Figure 20 of the drawings I have illustrated one member 56 of a pair of complementary members which comprise a supporting cup. Each of these members comprises a relatively large semicylindrical portion 57 and a relatively small cylindrical portion 58, connected by a preferably integral flat portion 59. The semicylindrical portion 58 is provided at opposite sides with ears 60 having openings 61 therein. When one of the cups is assembled the diameter of the portions 57 thereof correspond to the diameters of the rolled sleeve, while the diameter of the portions 58 correspond to the diameter of the pipe 42. In replacing the sleeve the upper and lower ends thereof are arranged in the portions 57 of the cups, and the complementary members of the cups may be secured together by bolts 62 arranged in the openings 61, as shown in Figure 14. The bolts 62 are adapted to clamp the portions 58 of the cups against the pipe 42, and accordingly it will be obvious that the cups serve to support the sleeve in position as illustrated in Figure 15. Any suitable form 63 may be arranged against the ceiling to cover the opening previously formed in the floor, and concrete or other material may be poured therein to fill the opening. The poured concrete obviously encases the sleeve thus permitting the removal of the cups 56. The floor itself will then support the sleeve, and the elements associated with the sleeve may be assembled by using the plates 44 at both ends of the sleeve for securing the floor and ceiling plates in position.

In some cases it is not required that the sleeve be replaced after the opening has been enlarged, if the opening, after being cut, is not sufficiently large to extend outwardly beyond the floor and ceiling plates. As shown in Figure 16, I provide means for securing the floor and ceiling plates in position without the use of the sleeve. As shown, a pair of the clips 49 are associated with the floor and ceiling plates, and the pairs of clips are connected by wires 64 connected at their ends to the slots 51. The lower clips are dropped down through the opening surrounding the pipe and screws 65 are passed through the openings in the ceiling plate and threaded into the openings 50 of the clips. The clips 49 at the upper ends of the wires are similarly secured to the floor plates as will be apparent.

The use of the spiral sockets 25 or other screw securing means is not necessary for supporting the ceiling plate. If desired, one of the plates 44 may be employed at the lower end of the sleeve in exactly the same manner as it is used at the upper end to secure the floor plate in position. When so used, one of the plates 44 is simply slipped over the lower end of the sleeve against the ceiling and the lower ends of the fingers 12 are bent outwardly to support the plate 44. The ceiling plate then may be placed in position by arranging screws in the opening of the ceiling plate and threading the screws in the openings 44. I prefer, however, to employ the spiral sockets 25 in actual practice.

In Figures 18 and 19 of the drawings I have shown means for arranging the sleeve in a previously formed brick wall. Referring to these figures, the numeral 66 designates a brick wall in which it is desired to arrange a steam or other pipe 67. Sufficient bricks are removed from the wall to provide a relatively large opening 68, as shown, after which the pipe is inserted in the opening. The sleeve 18 is then rolled in the manner described and is held in position by a pair of cups 56. The cups serve to support the sleeve concentric with the pipe as will be obvious, whereupon the opening 68 may be closed by filling with bricks or cement. The cups are then removed and a pair of plates 44 are arranged over the ends of the sleeve. Both ends of the sleeve in this case are split to provide fingers, and the latter are cut off at suitable points to provide relatively short portions 69 which may be bent outwardly to engage the plates 44 and hold them in position. Suitable finishing plates 70 similar to the floor and ceiling plates previously described then may be secured to the plates 44 by screws 71, the inner ends of which engage within the threaded openings of the blocks 46.

From the foregoing description it will be apparent that the blank 10 comprises an unfinished lining sleeve which is adapted readily to be formed in tubular shape to provide a lining sleeve for steam or similar pipes. By elongating the sleeve to permit it to project a substantial distance beyond the level of the floor, the bolt 19 may be removed from the opening 17 and the plate 20 may be removed from the lower end of the sleeve. The floor or other medium surrounding the sleeve then serves as the supporting means therefor and also prevents the latter from unrolling. The upper end of the sleeve then may be cut off to a suitable length in the manner described. By eliminating fastening elements from the finished sleeve to retain it in the rolled position, the sleeve may readily be removed whenever it is necessary to enlarge the opening in which the sleeve is arranged.

It is to be understood that the forms of the invention herewith shown and described and the method of forming the sleeves are to be taken as preferred examples of the same and that various changes in the shape, size, and arrangement of parts, and the method referred to may be made without departing from the spirit of the invention or the scope of the subjoined claims.

I claim:

1. The herein described method of producing lining sleeves for pipe openings which consists in slitting one end of a sheet of flexible material to form a plurality of fingers, rolling the sheet of material into substantially tubular form with the fingers thereof at one end, bending the fingers outwardly, surrounding said sleeve with a holding collar adjacent the fingers, releasably holding the opposite end of the sleeve in tubular form, forming a structure around the sleeve intermediate the collar and the opposite end of the sleeve, releasing the last named end of the sleeve, bending said fingers back to positions parallel to the axis of the sleeve, and sliding the collar from the adjacent end of the sleeve.

2. A device of the character described comprising a sheet of flexible material rolled to form a substantially tubular sleeve, one end of said sleeve being slit to provide a plurality of fingers, a collar adapted to slidably surround the end of said sleeve adjacent said fingers, said fingers being adapted to be bent outwardly to contact with the adjacent face of said collar, and releasable means associated with the opposite end of said sleeve and cooperating with said collar for holding said sleeve in tubular form.

3. A device of the character described comprising a sheet of flexible material rolled to form a substantially tubular sleeve, a collar adapted to slidably surround said sleeve adjacent one end, and releasable means associated with the opposite end of said sleeve and cooperating with said collar for holding said sleeve in tubular form.

4. A device of the character described comprising a sheet of flexible material rolled to form a substantially tubular sleeve with the edges of the sheet overlapping, a collar adapted to slidably surround said sleeve adjacent one end, and a removable fastening element passing through the overlapping portions of the sheet adjacent the opposite end of said sleeve.

5. A device constructed in accordance with claim 4, wherein the end of said sleeve adjacent said collar is slit to provide a plurality of fingers adapted to be bent outwardly to contact with the adjacent face of said collar.

6. A device of the character described comprising a sheet of flexible material rolled to form a substantially tubular sleeve, and a plurality of releasable means for holding said sleeve in tubular form, one of said means comprising a sheet metal collar adapted to slidably surround said sleeve adjacent one end.

7. A device of the character described comprising a sheet of flexible material rolled to form a substantially tubular sleeve, a collar adapted to slidably surround said sleeve adjacent one end, a screw receiving socket arranged against the face of said collar remote from the adjacent end of said sleeve, a screw passing through said collar and into said socket, and releasable means associated with the opposite end of said sleeve and cooperating with said collar for holding said sleeve in tubular form.

8. A device of the character described comprising a sheet of flexible material rolled to form a substantially tubular sleeve with the edges of the sheet overlapping, a collar adapted to surround said sleeve adjacent one end, a removable fastening element passing through the overlapping portions of the sheet adjacent the opposite end of said sleeve, said sleeve being provided adjacent said last named end with a plurality of openings, and guy wires secured at one end to the last named end of said sleeve, said guy wires passing through said plurality of openings.

9. The herein described method of producing and placing lining sleeves for pipe openings which consists in slitting one end of a sheet of flexible material to form a plurality of fingers, rolling the sheet of material into substantially tubular form with the fingers thereof at one end, bending the fingers outwardly, surrounding the sleeve with a holding collar adjacent and supported by the fingers, releasably holding the opposite end of the sleeve in tubular form, forming a structure around the sleeve intermediate the collar and the opposite end of the sleeve, the surrounding structure terminating inwardly of the releasable holding means, releasing the last named end of the sleeve, bending the fingers back to positions parallel to the axis of the sleeve, sliding the collar from the adjacent end of the sleeve, rebending the fingers outwardly, and arranging a ceiling plate over the end of the sleeve adjacent the fingers.

10. The herein described method of producing and placing lining sleeves for pipe openings which consists in slitting one end of a sheet of flexible material to form a plurality of fingers, rolling the sheet of material into substantially tubular form with the fingers thereof at one end, bending the fingers outwardly, surrounding the sleeve with a holding collar adjacent and in contact with the fingers, securing a socket to the collar, releasably holding the opposite end of the sleeve in tubular form, forming a structure around the sleeve intermediate the collar and the releasable holding means and spaced from the latter, the sockets being arranged outwardly of and parallel to the sleeve whereby they will be embedded in the surrounding structure, releasing the holding means, bending the fingers back to positions parallel to the axis of the sleeve, sliding the collar from the adjacent end of the sleeve with the sockets remaining embedded in the surrounding structure, rebending the fingers outwardly, and arranging a ceiling plate adjacent the end of the sleeve and securing it to the sockets.

11. The herein described method of producing and placing lining sleeves for pipe openings which consists in rolling a sheet of flexible material into substantially tubular form with the edges thereof freely overlapping, providing separate means adjacent each end of the sleeve for holding it in tubular form, securing anchoring sockets to one of the holding means outwardly of the sides of the sleeve and inwardly of the adjacent end thereof, forming a structure around the sleeve with the sockets embedded therein, releasing the holding means for the sleeve, arranging a ceiling plate against the end of the sleeve adjacent the sockets, and securing the plate to the sockets.

In testimony whereof I affix my signature.

LAWREN C. GNAGI.